United States Patent
Yoshikawa

(10) Patent No.: US 8,261,023 B2
(45) Date of Patent: Sep. 4, 2012

(54) DATA PROCESSOR

(75) Inventor: Kentaro Yoshikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 12/638,133

(22) Filed: Dec. 15, 2009

(65) Prior Publication Data

US 2010/0153656 A1 Jun. 17, 2010

(30) Foreign Application Priority Data

Dec. 16, 2008 (JP) .................................. 2008-319809

(51) Int. Cl.
*G06F 12/08* (2006.01)
(52) U.S. Cl. ........................................ 711/140; 711/131
(58) Field of Classification Search .......................... None
See application file for complete search history.

(56) References Cited

U.S. PATENT DOCUMENTS

| 6,499,085 | B2 * | 12/2002 | Bogin et al. | 711/118 |
| 7,028,151 | B2 * | 4/2006 | Imai et al. | 711/156 |
| 7,360,020 | B2 * | 4/2008 | Emberling | 711/118 |
| 7,464,242 | B2 * | 12/2008 | Barrick et al. | 711/169 |

FOREIGN PATENT DOCUMENTS

JP 05-053909 3/1993

* cited by examiner

*Primary Examiner* — Gary Portka
(74) *Attorney, Agent, or Firm* — Turocy & Watson, LLP

(57) ABSTRACT

A data processor includes a cache memory control section which includes: a hit/miss determination section which is supplied with a request for data processing to determine whether data to be processed is present in a cache memory and outputs a cache hit/miss determination result and, if having determined that the data is not present in the cache memory, feeds a read command to make an upper memory control section read the data from the upper memory; a FIFO storage which stores the cache hit/miss determination result and the in-block read position information according to a FIFO system; and a cache memory read/write section which reads the hit/miss determination result and the in-block read position information from the FIFO storage and reads the data from the cache memory, or writes the data from the upper memory control section into the cache memory and outputs the data.

8 Claims, 9 Drawing Sheets

DATA PROCESSOR

CROSS REFERENCE TO RELATED APPLICATION

This application claims benefit of priority under 35USC §119 to Japanese patent application No. 2008-319809, filed on Dec. 16, 2008, the contents of which are incorporated by reference herein.

BACKGROUND OF THE INVENTION

1. Field of the Invention

The present invention relates to a data processor.

2. Related Background Art

In utilization of a cache memory, often in the past, an emphasis was placed on a read latency upon cache hit (see, for example, Japanese Patent Laid Open Pub. 1993-053909).

However, there are environments in which an emphasis is placed on the throughput of data processing more than the latency for reading from the cache, which environments had a problem in that the data processing throughput might be deteriorated when cache hit and cache misses are mixed.

SUMMARY OF THE INVENTION

According to an aspect of the present invention, there is provided a data processor comprising:
a cache memory;
a data processing section;
an upper memory control section; and
a cache memory control section which is connected to the cache memory, the data processing section, and the upper memory controller, the cache memory control section comprising:
a hit/miss determination section which is supplied with a request for data processing from the data processing section and then determines whether data to be processed is present in the cache memory and outputs a cache hit/miss determination result as well as in-block read position information thereof and also, if having determined that the data to be processed is not present in the cache memory, provides the upper memory control section with a read command that permits the upper memory control section to read the data to be processed from the upper memory;
a first in, first out (FIFO) storage section which stores the cache hit/miss determination result and the in-block read position information according to the first in, first out system; and
a cache memory read/write section which reads the hit/miss determination result and the in-block read position information from the FIFO storage section and reads the data to be processed from the cache memory, or writes the data to be processed output from the upper memory control section into the cache memory and also outputs the data to be processed,
wherein if the cache miss occurs, the cache hit/miss determination section generates the read command prior to a response from the upper memory control section.

DETAILED DESCRIPTION OF THE INVENTION

Figure 1:
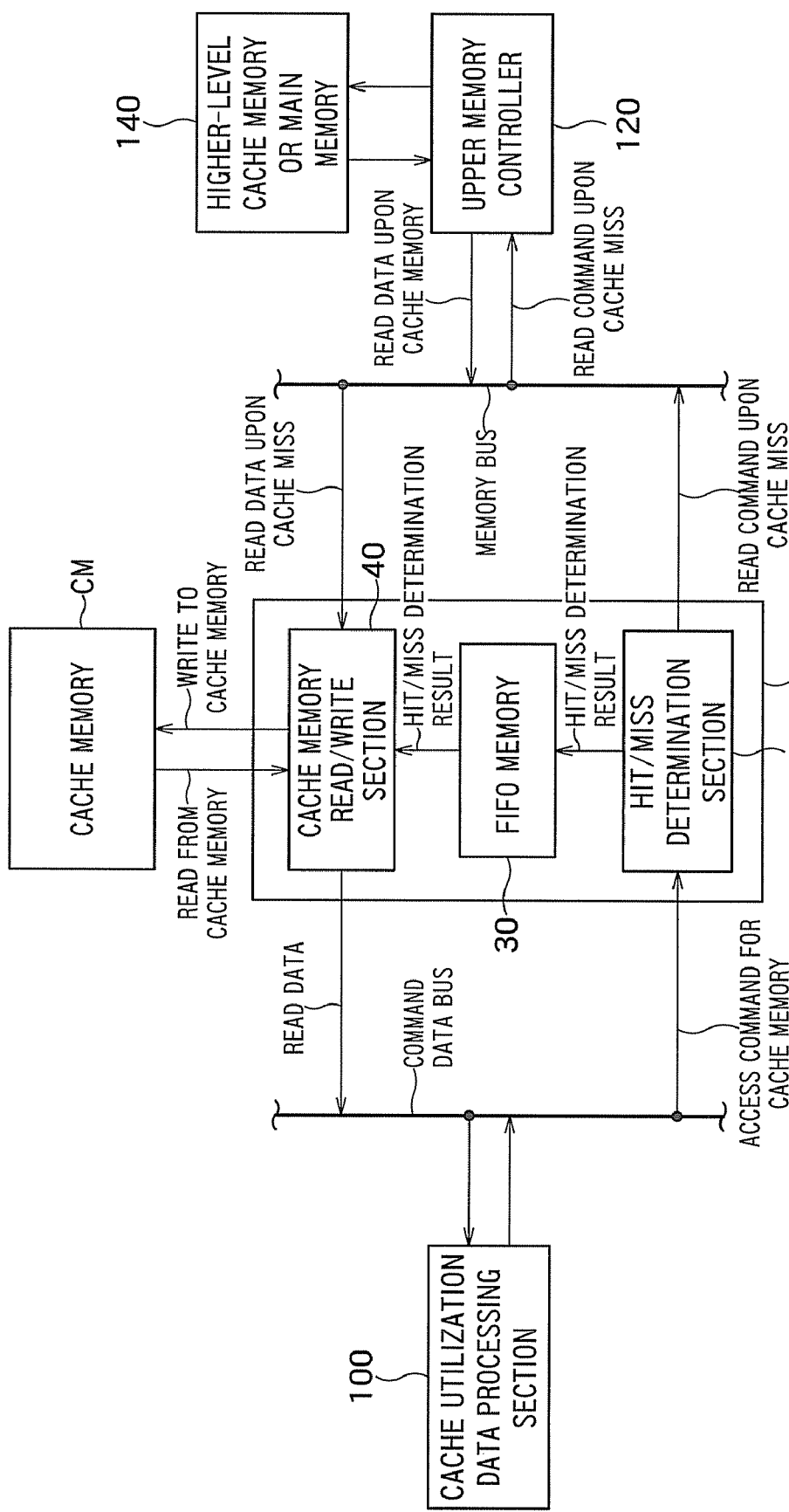
FIG. 1 is a block diagram showing an outlined constitution of a data processor according to a first embodiment of the present invention.

A description will be given below of some of the embodiments of the present invention with reference to the drawings. In the drawings, identical reference numerals are given to identical components, and repetitive description on the identical components will not be repeated in principle.

(1) First Embodiment

FIG. 1 is a block diagram showing the outlined constitution of a data processor according to the first embodiment of the present invention. One of the features of the present embodiment is that a cache memory control section 1 includes an FIFO memory 30 which is disposed between a hit/miss determination section 20 and a cache memory read/write section 40 and which stores the result of determination by the hit/miss determination section 20. This feature enables continuing the subsequent processing without waiting for a response from an upper memory such as a main memory when a cache miss is encountered. This will be described below in more detail.

The data processor of the present embodiment includes a cache memory CM, a cache utilization data processing section 100, an upper memory controller 120, and a cache memory control section 1. The cache memory control section 1 is connected to the cache memory CM and, via a command data bus, also to the cache utilization data processing section 100 and, via a memory bus, further to the upper memory controller 120. In the present embodiment, the cache utilization data processing section 100 corresponds to, for example, a data processing section and the upper memory controller 120 corresponds to, for example, an upper memory control section.

The cache memory control section 1 includes the hit/miss determination section 20, the FIFO memory 30, and the cache memory read/write section 40. The hit/miss determination section 20, if supplied with a cache memory access command, determines whether requested data is present in the cache memory CM. In the present embodiment, a command for gaining access to the cache memory CM is generated by the cache utilization data processing section 100 in response to a request from a user and input via the command data bus to the hit/miss determination section 20. The FIFO memory 30 stores the result of hit/miss determination by the hit/miss determination section 20 according to the FIFO system. The cache memory read/write section 40 reads the hit/miss determination result from the FIFO memory 30 and, in the case of a cache hit, performs read/write operations to the cache memory CM and also outputs read data to the cache utilization data processing section 100. In the case of a cache miss, the hit/miss determination section 20 generates a read command to read data from the main memory or upper cache memory and outputs it to the memory bus. The read command in the case of a cache miss is read via the memory bus by the upper memory controller 120 so that the relevant data may be read from a higher-level cache memory or main memory 140. The read data upon cache miss thus read is output to the cache utilization data processing section 100 via the upper memory controller 120, the memory bus, the cache memory read/write section 40, and the command data bus.

Figure 2:
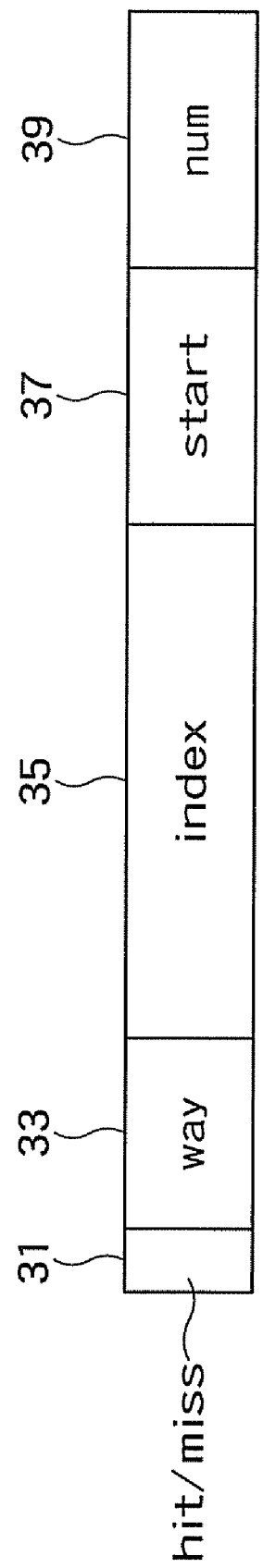
FIG. 2 is an explanatory diagram of information which is stored in an FIFO memory in the data processor shown in FIG. 1.

FIG. 2 is an explanatory diagram of information which is stored in the FIFO memory 30. The top position 31 stores a hit/miss determination result to be sent to the cache memory, being followed by positions 31, 33, 35, 37, and 39 for storing a way, a cache block index, a in-cache block transfer start address start, and a number of burst transfer's num, respectively. It is to be noted that if direct mapping is employed, the way information is not included, and if burst transfer is not accommodated, the number of burst transfer's num is not included. In the present embodiment, the cache block index and the in-cache block transfer start address start correspond to, for example, in-block read position information.

A description will be given in more detail of the specific constitution of the hit/miss determination section 20 and the relationship between the cache memory read/write section 40 and the cache memory CM with reference to FIGS. 3 and 4. For ease of the following explanation, the case of a direct map will be described in which burst transfer is not accommodated.

Figure 3:
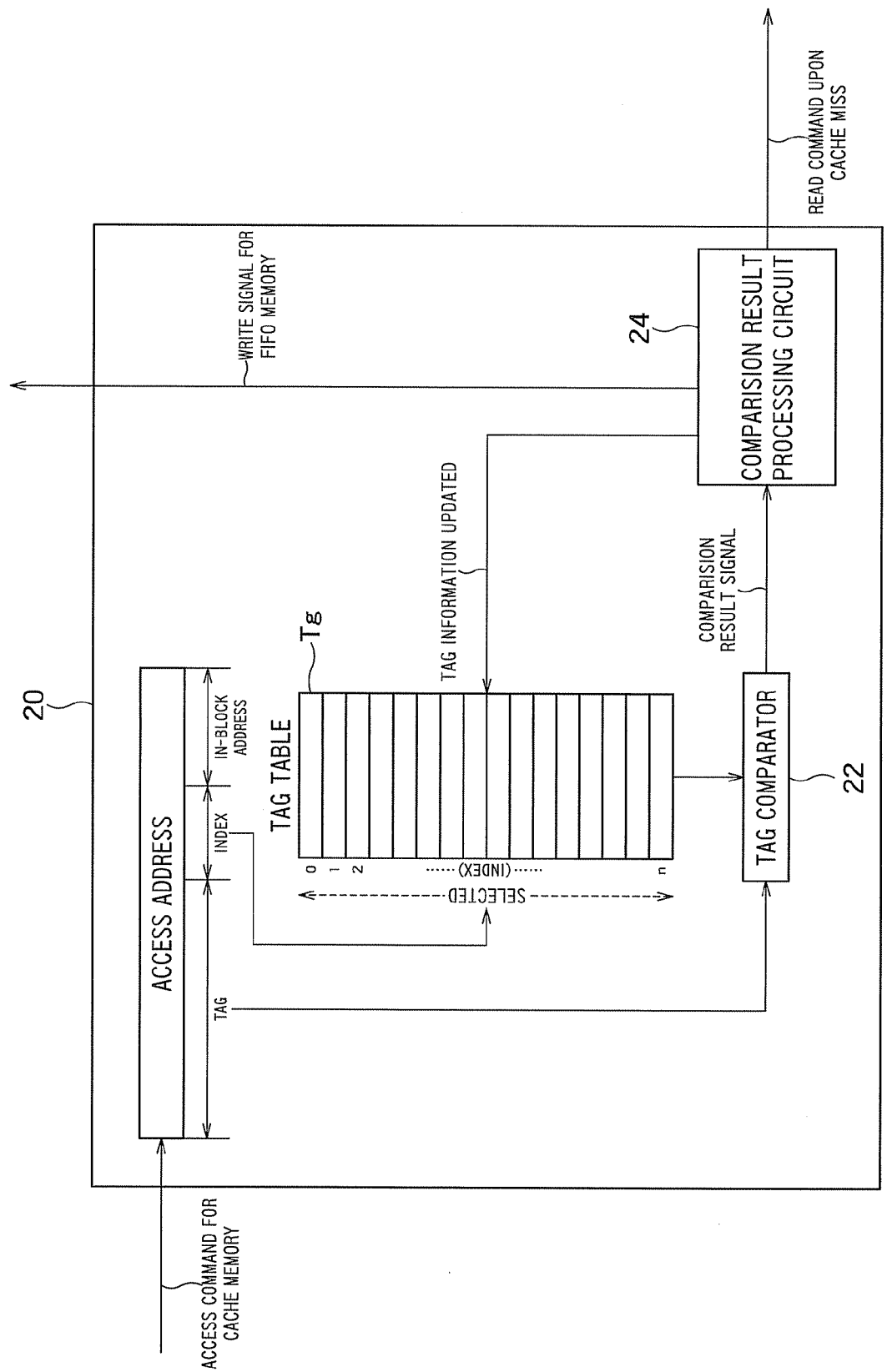
FIG. 3 is a diagram showing a more specific constitution of a hit/miss determination section in the data processor shown in FIG. 1.

As shown in FIG. 3, the hit/miss determination section 20 includes a memory which stores a tag table Tg, a tag comparator 22, and a comparison result processing circuit 24. If supplied with an access command for the cache memory, the tag comparator 22 compares a tag in a tag table Tg that corresponds to a cache block index of a requested access address to a tag of the requested access address, thereby determining whether the requested access address is present in the cache memory. A comparison result signal is output as the determination result from the tag comparator 22 to the comparison result processing circuit 24. If supplied with the comparison result signal, the comparison result processing circuit 24 generates a write signal for the FIFO memory 30, thus writing the information pieces of the cache memory-destined hit/miss determination result 31, the cache block index 35, and the in-cache block transfer start address start 37 into the FIFO memory 30 according to the FIFO system. In the case of a cache miss, the comparison result processing circuit 24 generates and outputs a read command upon cache miss to read the relevant data from the upper memory, and then updates the tag information.

Figure 4:
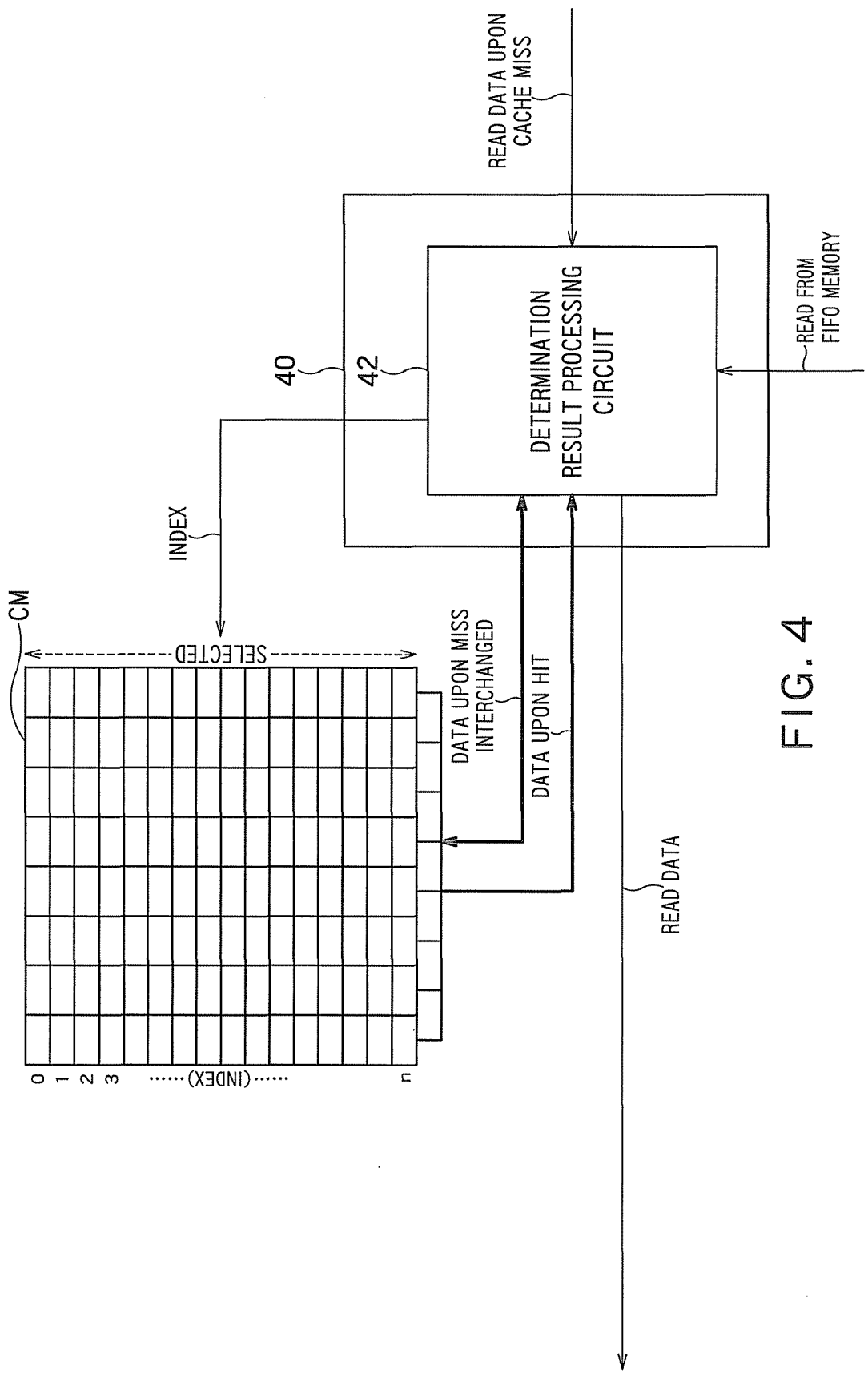
FIG. 4 is a diagram showing in more detail a relationship between a cache memory read/write section and a cache memory in the data processor shown in FIG. 1.

Further, as shown in FIG. 4, the cache memory read/write section 40 includes a determination result processing circuit 42. The determination result processing circuit 42 reads the information pieces of the cache memory-destined hit/miss determination result 31, the cache block index 35, and the in-cache block transfer start address start 37 from the FIFO memory 30, reads data stored in the relevant address in the cache memory CM from it, and outputs the data as read data. Further, in the case of the cache miss, the read data upon cache miss is provided from the upper memory controller 120 (see FIG. 1) to the determination result processing circuit 42, which in turn outputs this read data upon cache miss as the read data and also rewrites (updates) the data of the relevant index in the cache memory CM with this read data upon cache miss.

The data processors of the past technologies had no memory between the hit/miss determination section and the cache memory read/write section as shown in FIG. 1 so that hit/miss determination result might be directly output to the cache memory read/write section. Accordingly, if a cache miss occurred, the cache memory read/write section could not process the subsequent hit/miss determination results until a response reached from the upper memory controller, thus suffering from a problem of a significant deterioration in throughput.

In contrast, in accordance with the data processor of the present embodiment, the hit/miss determination result is once stored in the FIFO memory 30; the subsequent processing can be performed without waiting for a response from the upper memory controller 120. Therefore if, for example, cache misses occur continually, it is possible to output an access command for the higher-level cache memory or main memory 140 prior to a response due to the earlier cache miss. This can improve the data processing throughput.

(2) Second Embodiment

Figure 5:
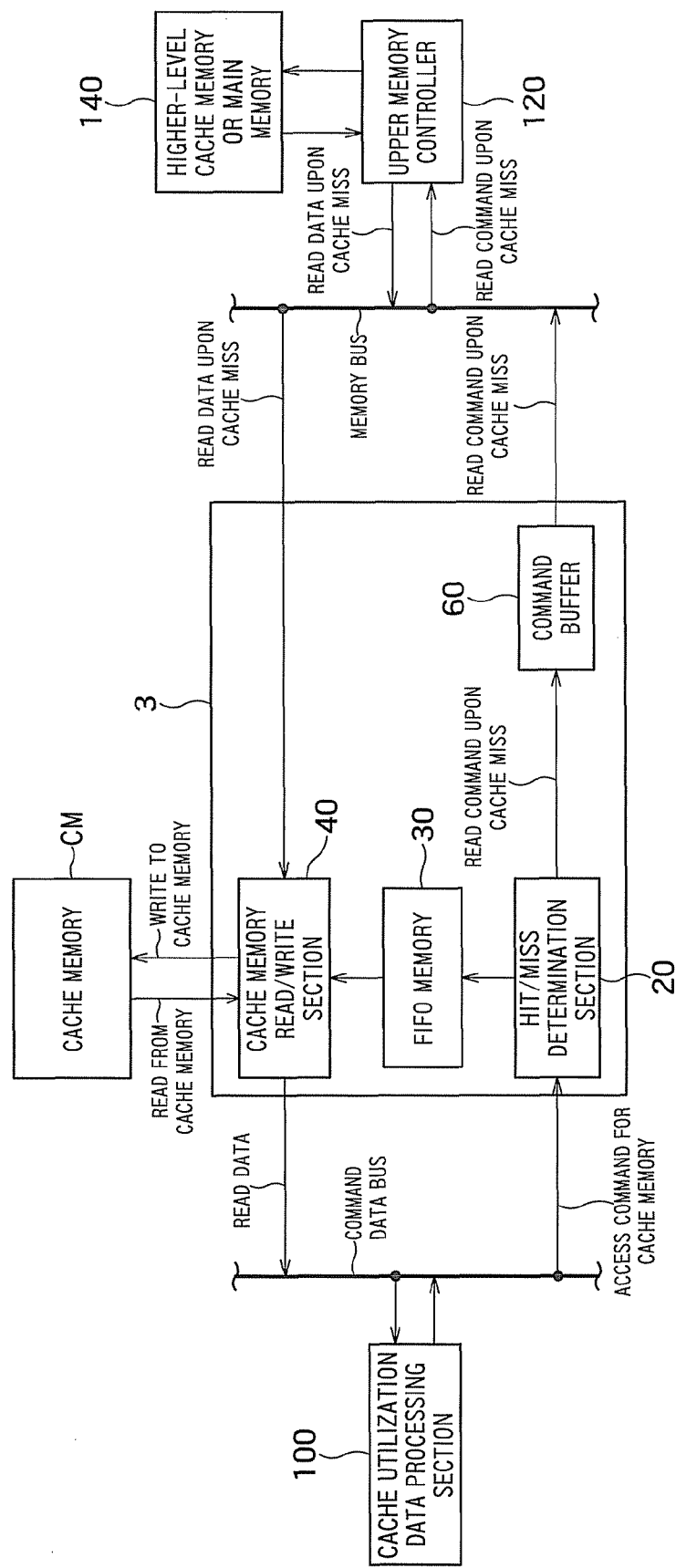
FIG. 5 is a block diagram showing an outlined constitution of a data processor according to a second embodiment of the present invention.

FIG. 5 is a block diagram showing the outlined constitution of a data processor according to a second embodiment of the present invention. As may be clear from comparison to FIG. 1, the feature of the data processor shown in FIG. 5 is that its cache memory control section 3 further includes a command buffer 60 that is connected to a hit/miss determination section 20 and that stores a read command at the time of a cache miss. The other components of the data processor of the present embodiment are essentially the same as those of the data processor shown in FIG. 1.

By thus outputting the read command upon cache miss to a memory bus via the command buffer 60, if cache misses occur frequently, for example, it is possible to output the read commands continually to an upper memory controller 120 without stopping the operations of the hit/miss determination section 20. This feature is well-suited to, for example, the case of processing requests to gain access to the cache memory in an environment in which the main memory is shared by a plurality of users (UMA: Unified Memory Architecture).

(3) Third Embodiment

Figure 6:
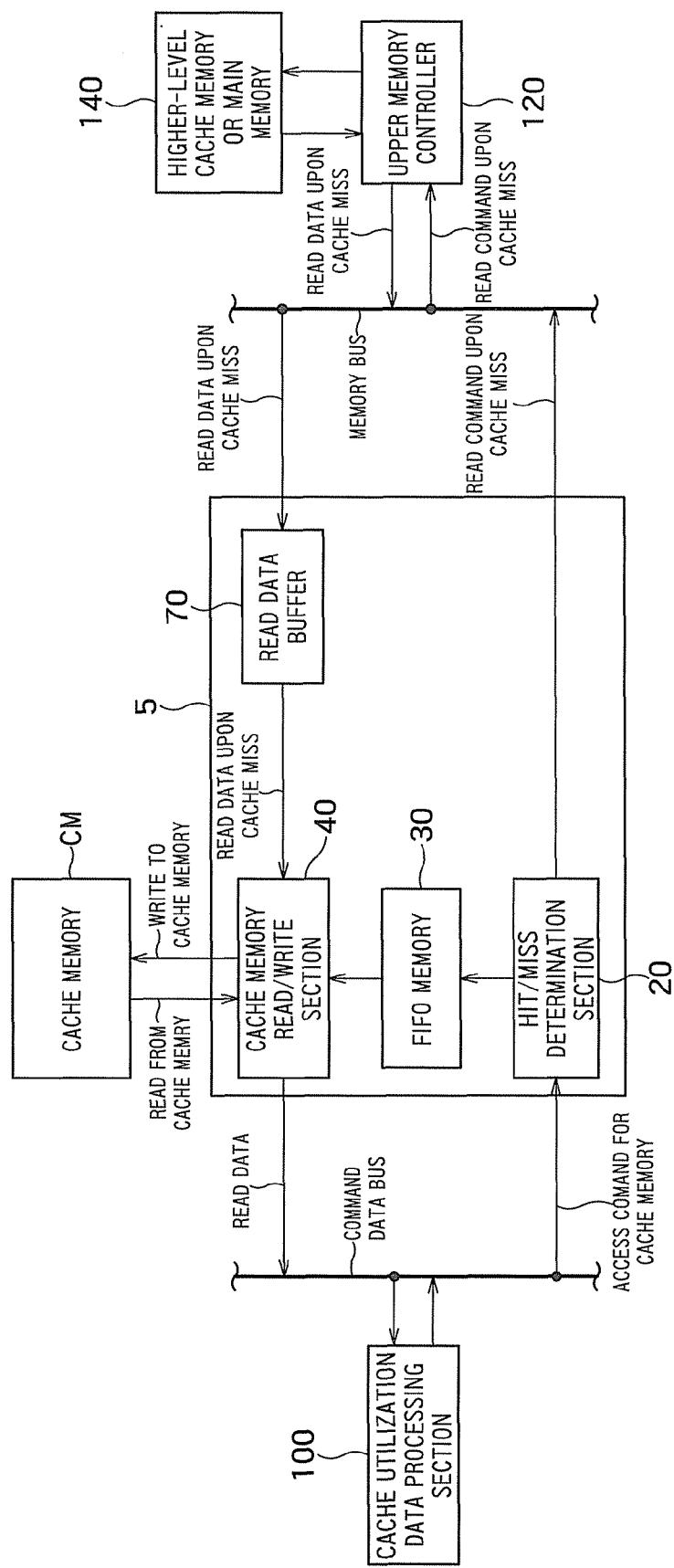
FIG. 6 is a block diagram showing an outlined constitution of a data processor according to a third embodiment of the present invention.

FIG. 6 is a block diagram showing the outlined constitution of a data processor according to a third embodiment of the present invention. As may be clear from comparison to FIG. 1, the feature of the data processor shown in FIG. 6 is that its cache memory control section 5 further includes a read data buffer 70 that is connected to a cache memory read/write section 40 and that stores read data at the time of a cache miss. The other components of the data processor of the present embodiment are essentially the same as those of the data processor shown in FIG. 1.

By thus outputting the read data upon cache miss to the cache memory read/write section 40 via the read data buffer 70, if cache misses occur frequently, it is possible to obtain, for example, the following effects:

1) If cache hits occur continually, information pieces of the cache hits are stored in an FIFO memory 30 in sequence; however, when cache misses subsequently occur in reversal continually, even if a response comes from an upper memory controller 120, the cache memory read/write section 40 is busy in processing the cache hits and so disturbed from smoothly receiving the read data supplied from the upper memory controller 120, thus being delayed greatly in the subsequent processing in some cases. This problem may be significant especially in the UMA environment, thus leading to a significant deterioration in throughput at the other users. To solve the problem, the present embodiment causes the read data buffer 70 to once receive the read data pieces output from the upper memory controller 120 earlier than the cache memory read/write section 40. This permits the cache memory read/write section 40 to smoothly and sequentially process those read data pieces stored in the read data buffer 70 after the immediate cache hit processing is ended.

2) When the specifications of the upper memory controller 120 are arranged in a manner that the upper memory controller 120 can receive new read commands only after it outputs read data upon cache miss to a cache memory control section 5, if cache misses occur frequently, there occurs a case where the read command cannot be received by the upper memory controller 120, in which case a hit/miss determination section 20 stops in operation. To solve the problem, the present embodiment causes the read data buffer 70 to once receive the read data pieces output from the upper memory controller 120. This permits the upper memory controller 120 to smoothly receive the new read commands from the hit/miss determination section 20, thereby preventing a deterioration in throughput of the data processor.

(4) Fourth Embodiment

Figure 7:
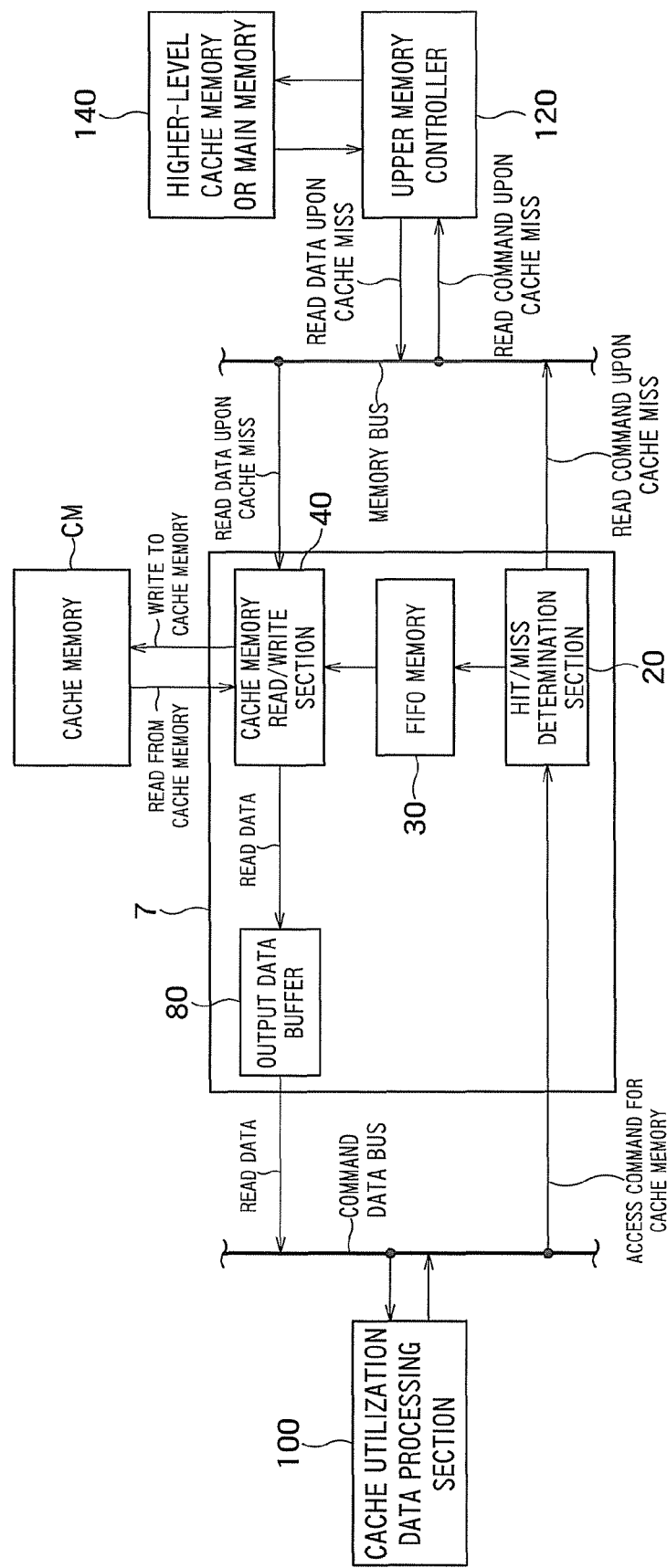
FIG. 7 is a block diagram showing an outlined constitution of a data processor according to a fourth embodiment of the present invention.

FIG. 7 is a block diagram showing the outlined constitution of a data processor according to a fourth embodiment of the present invention. As may be clear from comparison to FIG. 1, the feature of the data processor shown in FIG. 7 is that its cache memory control section 7 further includes an output data buffer 80 that is connected to a cache memory read/write section 40 and that stores read data output by the cache memory read/write section 40. The other components of the data processor of the present embodiment are essentially the same as those of the data processor shown in FIG. 1.

By thus causing the output data buffer 80 to once receive the read data output from the cache memory read/write section 40, it is possible to obtain, for example, the following effects:

1) If cache hits occur continually, data pieces requested by the user are sequentially sent to the user from a cache memory CM via the cache memory read/write section 40. At this time, a lot of data pieces cannot be processed in a cache utilization data processing section 100 in some cases.

In the present embodiment, the user can receive read data pieces sequentially via the output data buffer 80 and so can continue to gain access to the cache memory as processing the received read data pieces sequentially, while continuously making determination on cache hit/miss. It is thus possible to prevent a deterioration in throughput of the data processor.

2) There is a case in which the processing speed is different between a memory bus and a command data bus like, for example, a case where the memory bus has a processing speed of 200 MHz at a width of 64 bits and the command data bus has a processing speed of 200 MHz at a width of 32 bits. In this case, even if a trial is made to input read data from a higher level cache memory or main memory 140 to the cache memory read/write section 40 via an upper memory controller 120, the immediately preceding read data piece is yet to be output to the cache utilization data processing section 100, so that the read data from the upper memory controller 120 cannot be processed in the cache memory read/write section 40 in some cases. In such a case, if the read data is once stored in the output data buffer 80, a difference in timing between the outputting and the inputting can be eliminated, thereby preventing a deterioration in throughput of the data processor.

(5) Fifth Embodiment

Figure 8:
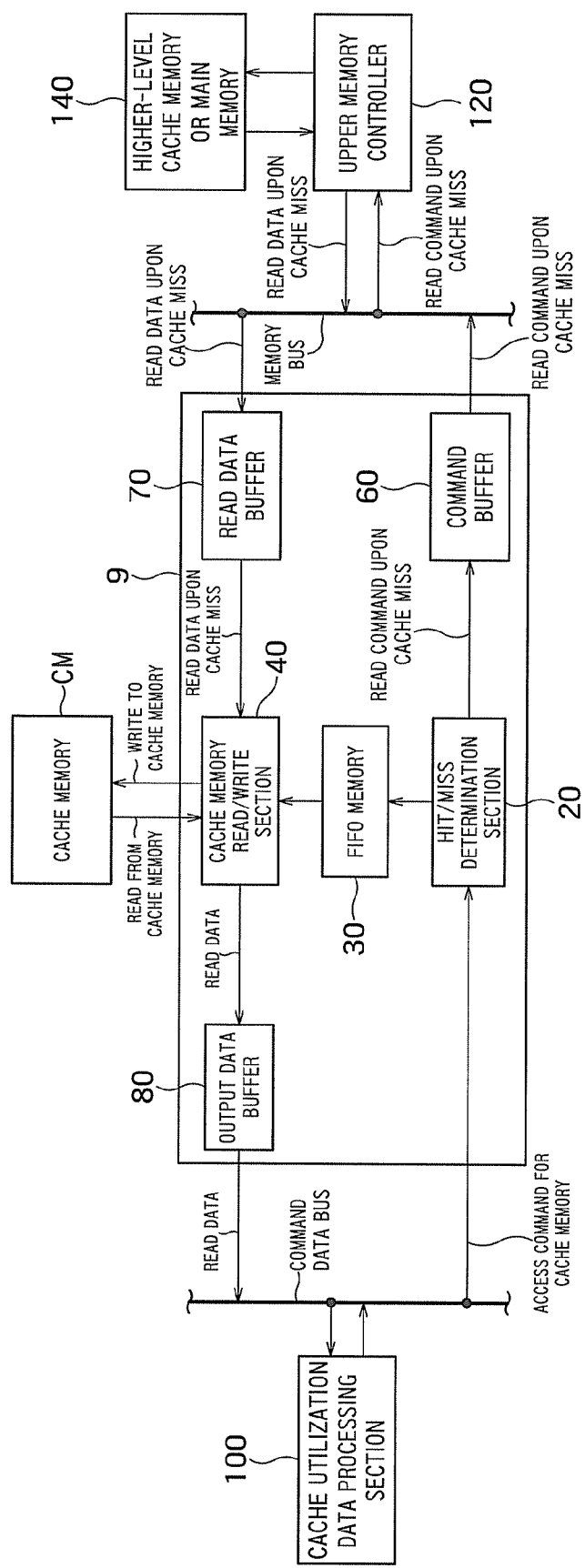
FIG. 8 is a block diagram showing an outlined constitution of a data processor according to a fifth embodiment of the present invention.

FIG. 8 is a block diagram showing the outlined constitution of a data processor according to a fifth embodiment of the present invention. The feature of the data processor shown in FIG. 8 is that besides the components shown in FIG. 1, its cache memory control section 9 further includes all of the command buffer 60, the read data buffer 70, and the output data buffer 80, which are the aforesaid features of the second through fourth embodiments. It is thus possible to realize data processing with high throughput even if either of cash hits or cash misses occurs disproportionately and frequently and even if the processing rate is different between the memory bus and the command data bus as described above.

(6) Sixth Embodiment

Figure 9:
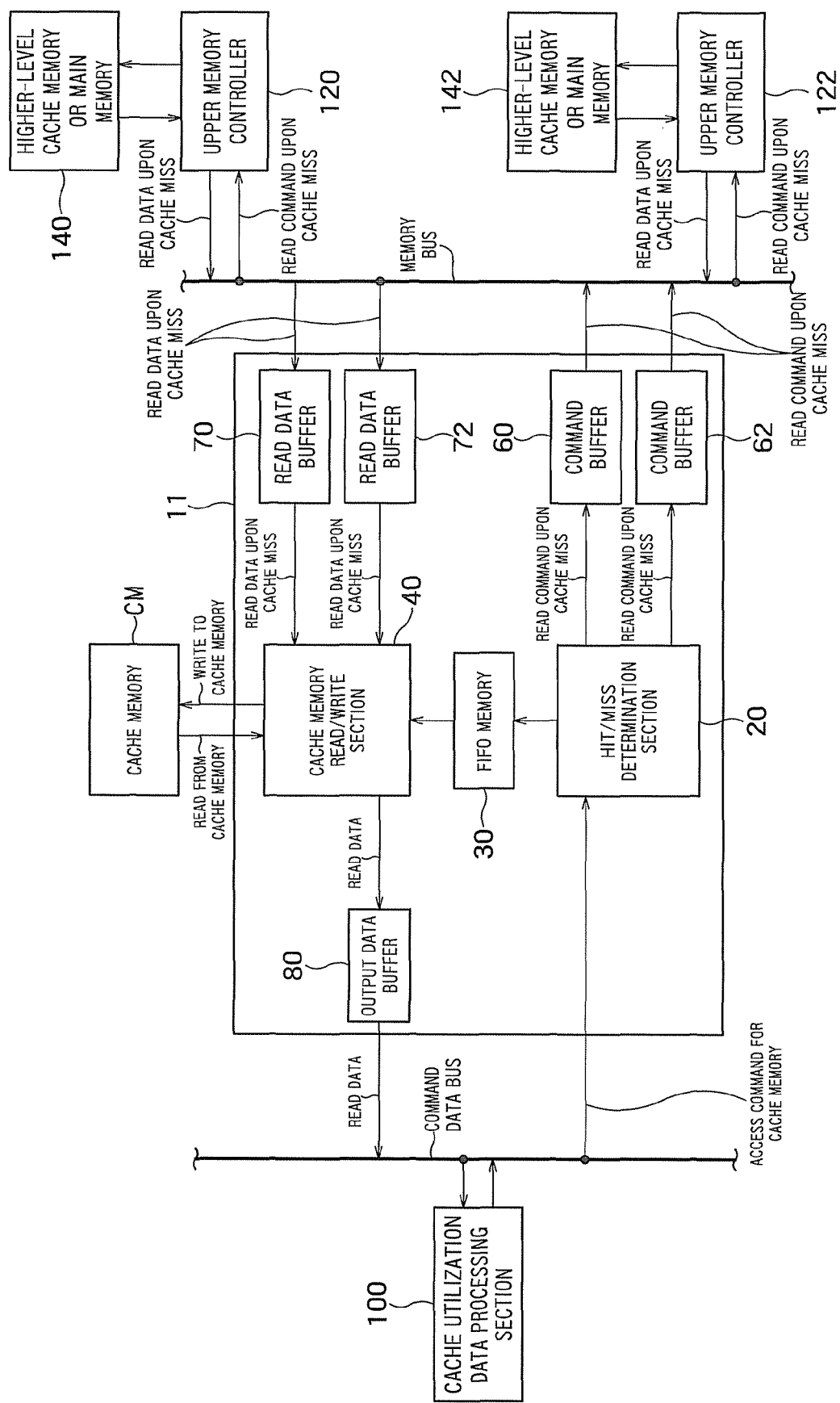
FIG. 9 is a block diagram showing an outlined constitution of a data processor according to a sixth embodiment of the present invention.

FIG. 9 is a block diagram showing the outlined constitution of a data processor according to a sixth embodiment of the present invention. As may be clear from comparison to FIG. 8, the feature of the data processor shown in FIG. 9 is that it further includes upper memory controller 122 and higher-level cache memories or main memory 142 connected thereto, and correspondingly, its cache memory controller 11 further includes a buffer 62 and a read data buffer 72. These components make up a configuration that enables the cache memory controller 11 to gain access to the higher-level cache memories or main memories independently of each other. A hit/miss determination section 20 is connected to the two command buffers 60 and 62, and similarly a cache memory read/write section 40 is also connected to the two read data buffers 70 and 72. The other components of the data processor of the present embodiment are essentially the same as those of the data processor shown in FIG. 8.

The single data processor, which is connected to a plurality of the higher-level cache memories or main memories, can be employed in such a system in which, for example, a plurality of DRAM chips may be controlled by mutually independent memory controllers respectively. In this case, the simplest method of distinguishing between, for example, the two chips by using the hit/miss determination section 20 and the cache memory read/write section 40 may be to assign different addresses to them. For example, in the embodiment shown in FIG. 9:

0×000000000–0×1FFFFFFF is assigned to the higher-level cache memory or main memory 140; and 0×200000000–0×3FFFFFFF is assigned to the higher-level cache memory or main memory 142.

Another method may be to employ a protocol that simultaneously outputs the information of an address space in addition to the commands and addresses, depending on the design of the buses. For example, with regard to the signal of Add rSpace:

If the signal of AddrSpace=0, the higher-level cache memory or main memory 140 is identified; and if AddrSpace=1, the higher-level cache memory or main memory 142 is identified.

The present embodiment enables the cache memory controller 11 to connect the memory controller to a plurality of higher-level cache memories or main memories via the corresponding upper memory controllers 120 and 122 and so is advantageous in particular when, for example, the average latencies in reading from those respective memories have a bias among them.

It will be described specifically with reference to FIG. 9 again as follows: assume, for example, that the higher-level cache memory or main memory 140 is of 50 cycles and the higher-level cache memory or main memory 142 is of 200 cycles and also that the data processor includes only the single command buffer 60 as the command buffer. If, on this assumption, commands for the higher-level cache memory or main memory 142 reach the command buffer 60 under a condition where a plurality of commands for the higher-level cache memory or main memory 140 are accumulated in the command buffer 60, those commands for the higher-level cache memory or main memory 142 cannot be processed until the commands for the higher-level cache memory or main memory 140 are all processed, even if the processing the higher-level cache memory or main memory 142 must be prioritized over the processing for the higher-level cache memory or main memory 140.

The present embodiment can avoid such a situation. This holds true also with read buffers.

It is to be noted that the plurality of command buffers and the plurality of read data buffers can respectively be changed in size from each other depending on differences, for example, in frequency of accessing the plurality of connection-destination for higher-level cache memories or main memories.

(7) Others

Although the present invention has been described with reference to its embodiments, it is to be understood that the present invention is not limited to these embodiments whatsoever and, of course, can be modified variously within its technical scope. For example, although the second through sixth embodiments have been described with reference to the case where they have included some or all of the command buffers 60 and 62, the read data buffers 70 and 72, and the output data buffer 80 in addition to the components of the data processor shown in FIG. 1, the present invention is not limited to these embodiments whatsoever and, of course, such an embodiment can be employed as to further include other combinations of any two of the command buffer, the read data buffer, and the output data buffer.

What is claimed is:

1. A data processor comprising:
   a cache memory;
   a data processing section;
   an upper memory control section; and
   a cache memory control section which is connected to the cache memory, the data processing section, and the upper memory controller, the cache memory control section comprising:
   a hit/miss determination section which is supplied with a request for data processing from the data processing section and then determines whether data to be processed is present in the cache memory and outputs a cache hit/miss determination result as well as in-block read position information thereof and also, if having determined that the data to be processed is not present in the cache memory, provides the upper memory control section with a read command that permits the upper memory control section to read the data to be processed from the upper memory, the in-block read position information comprising a cache block index and an in-cache block transfer start address;
   a first in, first out (FIFO) storage section which stores the cache hit/miss determination result and the in-block read position information according to the first in, first out system; and
   a cache memory read/write section which reads the hit/miss determination result and the in-block read position information from the FIFO storage section and reads the data to be processed from the cache memory, or writes the data to be processed output from the upper memory control section into the cache memory and also outputs the data to be processed,
   wherein if the cache miss occurs continually, the cache hit/miss determination section generates a subsequent read command prior to a response from the upper memory control section.

2. The data processor of claim 1, wherein the in-block read position information further comprises the number of the read data pieces for the purpose of burst transfer.

3. The data processor of claim 1, further comprising a first buffer that stores the read command to be output from the cache hit/miss determination section.

4. The data processor of claim 1, further comprising a second buffer which stores the data to be processed which is read from the upper memory and output from the upper memory control section.

5. The data processor of claim 1, further comprising a third buffer which is connected to the cache memory read/write section and which stores the data to be processed which is output from the cache memory read/write section.

6. The data processor of claim 1, comprising a plurality of the upper memory control sections respectively connected to a plurality of the upper memories, wherein the cache hit/miss determination section generates and outputs the read command for each of the upper memory control sections, and
   the cache memory read/write section receives the data to be processed from each of said plurality of upper memory control sections.

7. The data processor of claim 6, further comprising a plurality of first buffers which each store the read command output from the cache hit/miss determination section for each of the upper memory control sections.

8. The data processor of claim 6, further comprising a plurality of second buffers which are each connected to each of said plurality of upper memory control sections and each store the data to be processed which is read from each of said plurality of upper memories and output.

* * * * *